(12) United States Patent
De Koning-Trum et al.

(10) Patent No.: US 10,342,215 B2
(45) Date of Patent: Jul. 9, 2019

(54) COAT GROOMING DEVICE AND METHOD FOR BRUSHING A COAT

(71) Applicants: Antonia Maria Johanna De Koning-Trum, Biezenmortel (NL); Johannes Wilhelmus Maria De Koning, Biezenmortel (NL)

(72) Inventors: Antonia Maria Johanna De Koning-Trum, Biezenmortel (NL); Johannes Wilhelmus Maria De Koning, Biezenmortel (NL)

( * ) Notice: Subject to any disclaimer, the term of this patent is extended or adjusted under 35 U.S.C. 154(b) by 174 days.

(21) Appl. No.: 14/903,758

(22) PCT Filed: Jul. 8, 2014

(86) PCT No.: PCT/NL2014/050463
§ 371 (c)(1),
(2) Date: Jan. 8, 2016

(87) PCT Pub. No.: WO2015/005781
PCT Pub. Date: Jan. 15, 2015

(65) Prior Publication Data
US 2016/0165842 A1    Jun. 16, 2016

(30) Foreign Application Priority Data

Jul. 9, 2013   (NL) .................................... 2011127

(51) Int. Cl.
*A01K 13/00*    (2006.01)

(52) U.S. Cl.
CPC .................................. *A01K 13/002* (2013.01)

(58) Field of Classification Search
CPC .............................. A01K 13/002; A01K 13/00
USPC ........................................ 119/601; 15/23, 27
See application file for complete search history.

(56) References Cited

U.S. PATENT DOCUMENTS

| | | | | |
|---|---|---|---|---|
| 2,172,024 A | * | 9/1939 | Haluss | A46B 13/02 |
| | | | | 119/609 |
| 2,753,583 A | * | 7/1956 | Jepson | A01K 13/002 |
| | | | | 119/609 |
| 3,183,591 A | * | 5/1965 | Dumont | B26B 19/42 |
| | | | | 15/23 |
| 3,308,500 A | * | 3/1967 | Woodruff | A01K 13/002 |
| | | | | 119/606 |
| 3,639,941 A | * | 2/1972 | Kirwan | A47L 5/30 |
| | | | | 15/372 |
| 3,894,547 A | * | 7/1975 | Scivoletto | A45D 20/52 |
| | | | | 132/118 |

(Continued)

FOREIGN PATENT DOCUMENTS

| | | | | |
|---|---|---|---|---|
| CA | 2715104 A1 | * | 3/2011 | ........... A01K 13/002 |
| DE | 102004028609 A1 | * | 1/2006 | ........... A01K 13/002 |

(Continued)

*Primary Examiner* — Magdalena Topolski
*Assistant Examiner* — Morgan T Barlow
(74) *Attorney, Agent, or Firm* — Marcus C. Dawes

(57) ABSTRACT

A coat grooming device and a method for grooming a coat. The device comprises: a frame; a grooming unit connected to the frame and provided with a rotatable brush belt; and a drive operatively connected to the brush belt for rotating the brush belt. The brush belt can be rotated by providing a grooming unit which comprises a rotatable brush belt and an associated drive.

13 Claims, 13 Drawing Sheets

(56) References Cited

U.S. PATENT DOCUMENTS

| | | | | |
|---|---|---|---|---|
| 3,916,476 A * | 11/1975 | Johnson | A47L 9/0411 | 15/325 |
| 4,083,327 A * | 4/1978 | Dowdy | A01K 13/002 | 119/601 |
| 4,630,329 A * | 12/1986 | Shores | A01K 13/002 | 15/352 |
| 4,779,572 A * | 10/1988 | Freulon | A01K 13/002 | 119/604 |
| 4,815,232 A * | 3/1989 | Rawski | A01K 13/002 | 119/625 |
| 5,074,006 A * | 12/1991 | Eremita | A01K 13/002 | 15/344 |
| 5,207,183 A * | 5/1993 | Praschnik | A01K 13/002 | 119/609 |
| 5,339,840 A * | 8/1994 | Koppel | A01K 13/002 | 119/625 |
| 6,055,938 A * | 5/2000 | Klein | A01K 13/002 | 119/606 |
| 6,086,682 A * | 7/2000 | Anderson | A01K 13/00 | 134/21 |
| 7,665,422 B2 * | 2/2010 | Kissel, Jr. | A01K 13/00 | 119/609 |
| 8,006,648 B1 * | 8/2011 | Sourwine | A01K 13/002 | 119/609 |
| 8,132,541 B1 * | 3/2012 | Baer, Jr. | A01K 13/002 | 119/664 |
| 9,795,116 B1 * | 10/2017 | Czajkowski | A01K 13/002 | |
| 9,867,363 B2 * | 1/2018 | Ristaniemi | A01K 13/002 | |
| 2006/0272593 A1 * | 12/2006 | Morrison | A01K 13/002 | 119/632 |
| 2007/0169720 A1 * | 7/2007 | Roy | A01K 13/002 | 119/615 |
| 2009/0223008 A1 * | 9/2009 | Kissel, Jr. | A01K 13/00 | 15/179 |
| 2011/0030620 A1 * | 2/2011 | Jouan | A01K 13/002 | 119/611 |
| 2011/0308035 A1 * | 12/2011 | Casper | A01K 13/001 | 15/344 |
| 2012/0304938 A1 * | 12/2012 | Wang | A01K 13/002 | 119/618 |
| 2013/0145992 A1 * | 6/2013 | Liang | A47L 7/0066 | 119/608 |
| 2014/0238310 A1 * | 8/2014 | Holt, Jr. | A01K 13/002 | 119/631 |
| 2015/0156985 A1 * | 6/2015 | Ristaniemi | A01K 13/002 | 119/611 |
| 2016/0330933 A1 * | 11/2016 | Baier | A01K 13/002 | |
| 2016/0338319 A1 * | 11/2016 | Liang | A01K 13/002 | |

FOREIGN PATENT DOCUMENTS

| | | | | |
|---|---|---|---|---|
| DE | 102014100615 B3 * | 2/2015 | | A01K 13/002 |
| FR | 2885765 A1 * | 11/2006 | | A01K 13/002 |
| FR | 3024642 A1 * | 2/2016 | | A01K 13/002 |
| GB | 2370754 | 7/2002 | | |
| JP | 3935494 B1 * | 6/2007 | | A01K 13/002 |
| JP | 2009142151 A * | 7/2009 | | A01K 13/002 |
| WO | WO-8100339 A1 * | 2/1981 | | A01K 13/002 |

* cited by examiner

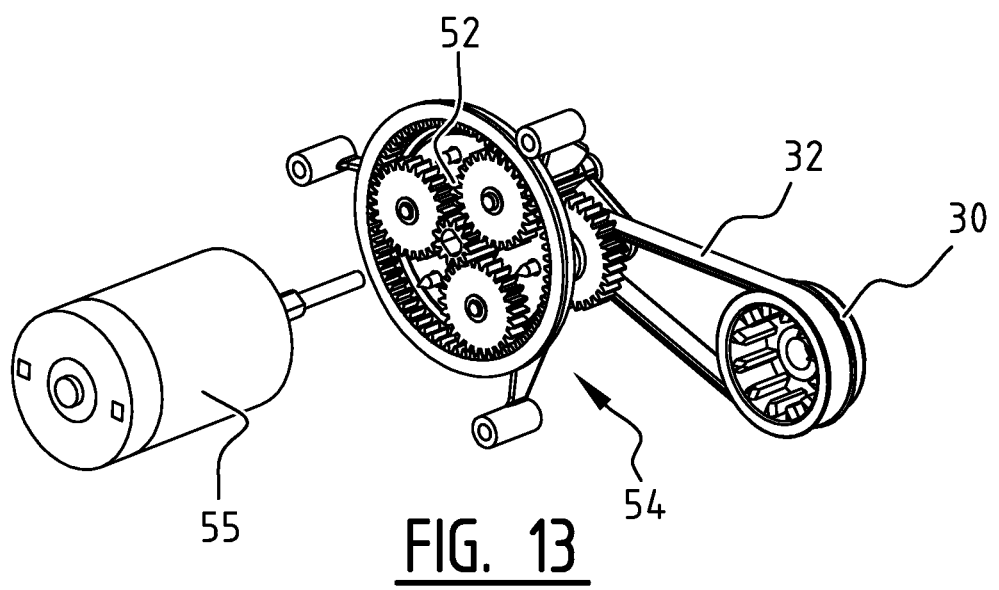

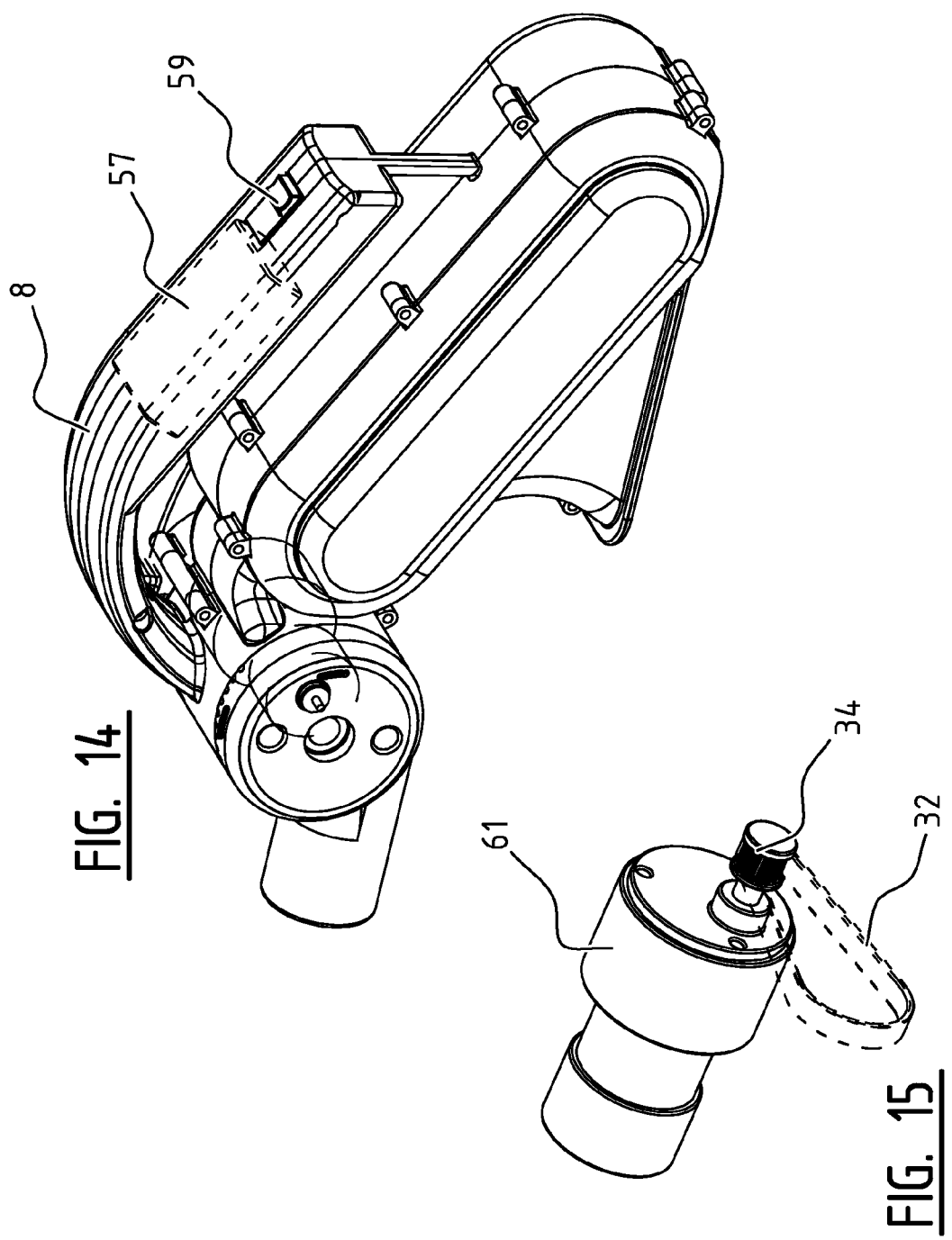

COAT GROOMING DEVICE AND METHOD FOR BRUSHING A COAT

The present invention relates to a coat grooming device provided with a brush unit for grooming a coat. The device is more particularly suitable for grooming a coat of an animal, particularly a dog's coat.

In coat grooming known in practice use is made of brushes and combs. Further known in practice are brushes which can be connected to a vacuum cleaner using an adapter. Owing to the connection to a vacuum cleaner loose hair is removed from the brush being moved through the coat by the user.

Problems occurring in practice relate to having to exert controlled forces on the hair and the coat in order to avoid for instance damage to the underlying skin and to prevent mutual entangling of individual hairs and/or having to remove loose hair carefully from the coat such that the operation of the grooming device is maintained.

The object of the present invention is to provide a coat grooming device which obviates or reduces the above stated problems.

This object is achieved with the grooming device according to the present invention, the grooming device comprising:
- a frame:
- a grooming unit connected to the frame and provided with a rotatable brush belt; and
- a drive operatively connected to the brush belt for rotating the brush belt.

The brush belt can be rotated by providing a grooming unit in which a rotatable brush belt is provided and a drive arranged therefor. It has been found that a coat grooming is realized in effective manner by the rotation of the brush belt.

The brush belt is preferably provided at an angle such that during use an angle is realized between the brush belt and the skin lying beneath the coat. This angle preferably lies in the range of 1°-70°, more preferably 1°-50°, still more preferably 1°-40° and most preferably 20°-30°. It has been found that the operation of the device according to the invention is hereby further improved.

The drive is moreover preferably configured to rotate the brush belt in a direction such that the side of the belt facing toward the coat moves from low to high. That is, due to the angle between belt and skin, the belt has a low part, i.e. a part placed closest to the skin, and a high part, i.e. a part located a greater distance from the skin, wherein the side of the belt facing toward the coat moves from the low part in the direction of the high part. Hairs of the coat are brushed in the same direction. The angle prevents hairs of the coat being carried all the way up to the upper side of the belt. Jamming of the belt is hereby prevented.

A suction means is also provided for suctioning hair from the brush belt. The brush belt hereby remains clean for further use. No manual actions by a user are hereby required for the purpose of keeping the brush belt clean, and the coat of an animal, such as a dog, can be groomed in more effective manner In a currently preferred embodiment use is made for suctioning purposes of a vacuum cleaner which is connected to the frame of the coat grooming device using a suction coupling. A suction force is for instance exerted here over the side of the brush belt oriented upward during use, for instance over substantially the whole upper surface thereof.

In an advantageous preferred embodiment according to the present invention the coat grooming device comprises a guard arranged round or close to the grooming unit for the purpose of preventing hairs coming to lie between moving parts.

Providing a guard for instance avoids hairs becoming wrapped around shafts of rotatable parts. This prevents, among other things, hair being pulled out in undesired manner Use is for instance further made here of a comb-like body for removing hair from the brush belt. Using the comb-like body hair is as it were lifted out from between the teeth of the brush in order to simplify suctioning.

The guard preferably comprises air guides for realizing an underpressure during use such that hairs of the coat extend upward from an underlying skin. This greatly simplifies grooming of the coat.

In a further advantageous preferred embodiment according to the present invention the device comprises a spacer for holding the grooming unit at a distance from a skin lying beneath the coat.

Arranging a spacer can guarantee that the distance between the different elements of the grooming device according to the invention and the coat and the underlying skin is maintained as well as possible during use. The operation of the grooming device is hereby optimized.

The spacer is preferably substantially wedge-shaped for the purpose of realizing the angle between the brush belt and the skin lying beneath the coat.

The opposite side of the wedge-shaped spacer preferably has an inward oriented curvature. Hair of the coat will follow this curvature when carried along by the brush belt. A curved path is imposed by the curvature, thereby preventing hair of the coat being carried along by the belt all the way up to the upper side of the belt, which could result in jamming of the belt.

Alternatively or additionally the spacer is coupled releasably to the frame so that the spacer can be replaced integrally by a replacement spacer with a different angle and/or spacing.

The spacer is preferably adjustable such that the angle and/or distance relative to the skin can be adjusted. Hair of different lengths can hereby be taken into account.

Brush bristles or brush teeth are preferably provided at a distance from each other on the surface of the brush belt, wherein the brush belt is provided around rotatable rollers and the suction means is provided close to at least one of the rotatable rollers. Through rotation of the belt round the rollers the brush teeth or bristles placed at a distance from each other will be moved apart to some extent at the position of the rollers by the curvature of the belt, so that loose hairs of the coat which are carried along can be suctioned away in effective manner close to the rollers. The bristles/teeth open as it were at the position of the rollers.

The suction means is preferably provided at the roller furthest removed from the skin.

An edge of the brush belt is preferably free of brush bristles and teeth. This makes it possible for the guard to connect to the brush belt so that an airtight, at least substantially airtight, entity is obtained.

The device according to the invention preferably comprises a rotatable brush element provided operatively with the brush belt. Providing a brush element which co-rotates in co-action with the brush belt brings about an effective coat grooming In a currently preferred embodiment the spacer is provided integrally with the guard as discussed above. The grooming device can in this way be embodied in effective manner with a limited number of components.

In a further advantageous preferred embodiment according to the present invention the device also comprises tensioning means for tensioning and slackening the brush belt.

By providing tensioning means the tension applied to the brush belt can be adjusted, optionally determined in selective manner by the user, such that the tension is always sufficient during use for a good operation of the brush belt. By slackening the tensioning means the brush belt can be removed in effective manner for disassembly and for instance mounting of a new brush belt, for instance of a different type. The device according to the invention can in this way be deployed in flexible manner and is user-friendly.

The invention further relates to a coat grooming device for grooming a coat, comprising:
  a frame;
  a grooming unit connected to the frame and provided with
    a trimming unit provided with a rotatable blade; and
  a drive operatively connected to the blade for the purpose
    of rotating the blade.

The device preferably comprises a suction means for suctioning out hair. The rotatable blade cuts the hair, which has preferably been suctioned inward to some extent, to a determined length. The coat can in this way be given the same length over the whole surface thereof. Similar advantages are hereby gained as described above with reference to the brush unit.

The coat grooming device preferably comprises a spacer for holding a skin lying beneath the coat at a distance from the rotating blade.

The spacer holds the blade at a substantially constant distance from the skin during use. The hairs are thus cut to a substantially equal length.

The spacer preferably comprises adjusting means for adjusting the distance of the blade to the skin. The trimming unit for instance comprises a housing and the spacer is screwed to the housing. The spacer and the housing are provided for this purpose with screw thread. The position of the spacer on the housing can now be modified by screwing the spacer. The blade is situated in the housing. The distance the spacer creates between the skin and the blade can thus be adjusted.

The device preferably comprises a cover plate with openings for partially covering the rotating blade, wherein hair of the coat can extend through the openings of the cover plate in order to be cut. This increases the safety of the device. The openings preferably have a small size such that a finger of a user does not fit through the openings. The openings for instance have a size smaller than about 5 mm, preferably smaller than about 3 mm, most preferably smaller than about 1 mm.

In a preferred embodiment the cover plate comprises a mesh screen with openings smaller than about 5 mm, preferably smaller than about 3 mm and most preferably smaller than about 1 mm. Hairs have a dimension smaller than about 1 mm. Protecting the blade with the mesh screen prevents ears coming into contact with the blade.

The cover plate preferably comprises a stiff plate with openings, wherein a mesh screen is mounted on the stiff plate so that the mesh screen extends over the openings. This prevents the possibility of a finger or other protrusion being pressed through the mesh screen. This is because the force with which the finger presses against the cover plate is absorbed by the stiff plate. The openings in the stiff plate each have for instance a maximum size of 1-2 cm and the openings in the mesh screen a cross-section of a maximum of 1-5 mm.

A coat grooming device is for instance provided with a modular system and preferably comprising a modular snap system to enable an easy change between the brush unit and a trimming unit. A flexible device for grooming of the coat is hereby realized.

The invention also relates to a method for grooming a coat, comprising the steps of:
  providing a coat grooming device as described above;
  grooming the coat; and
  cleaning the brush belt or blade during brushing.

Such a method provides the same effects and advantages as described above for the coat grooming device and the individual parts thereof.

Further advantages, features and details of the invention are elucidated on the basis of the preferred embodiments thereof, wherein reference is made to the accompanying drawings, in which:

FIGS. 13-15 show details of a second possible drive of the grooming device of FIGS. 1-4;

Figure 1:
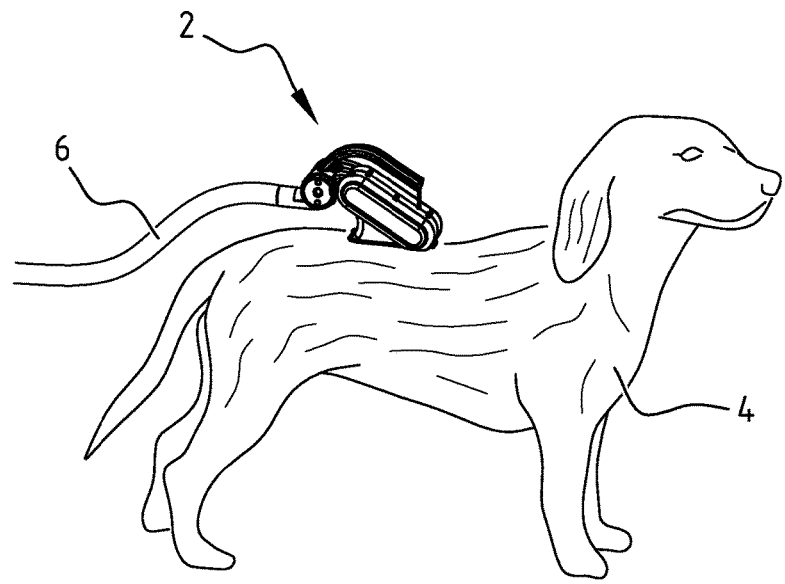
FIG. 1 shows an embodiment of a grooming device with a brush belt according to the invention in use during brushing of the coat of a dog.

Coat grooming device 2 (FIG. 1) can be used to groom a coat of an animal, such as a dog 4. Device 2 is connected by means of hose 6 to a vacuum cleaner for the purpose of suctioning loose hair from the coat.

Figure 2:
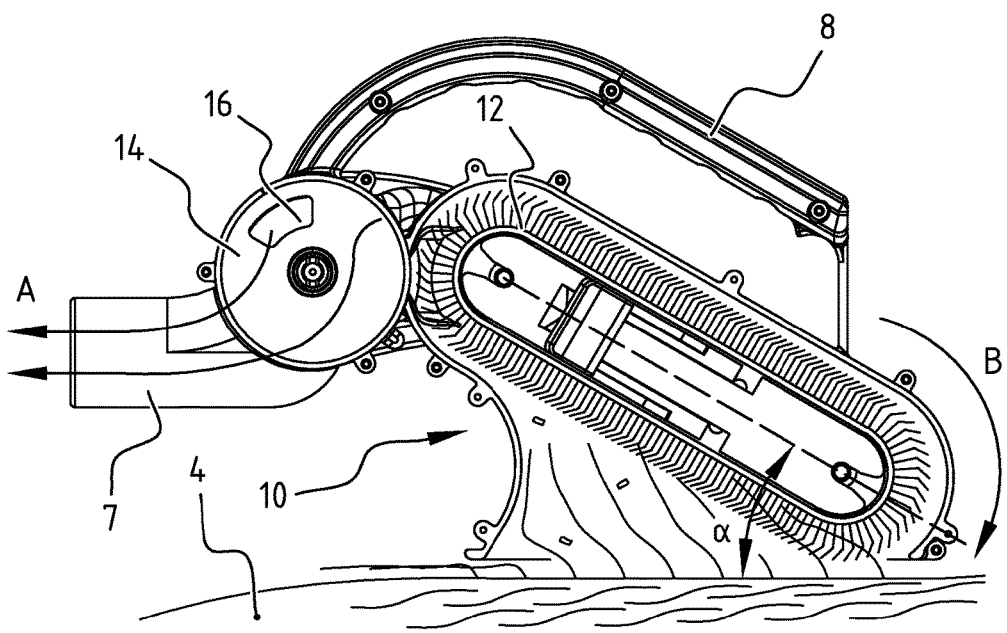
FIG. 2 shows a side view of the grooming device of FIG. 1.

The frame of device 2 comprises a handle 8 with which the user can move device 2 over the coat of dog 4 (FIG. 2). Device 2 further comprises a grooming unit 10, also referred to as brushing unit, which is connected to the frame. Grooming unit 10 comprises a brush belt 12 which is driven rotatably by a drive which will be further described below. Belt 12 rotates as according to arrow B.

Hose 6 of the vacuum cleaner can be coupled to a connection 7 which is connected to a housing 14 forming part of the frame. Housing 14 is part of a control mechanism for controlling the force with which loose hair is suctioned out of the coat and/or the force with which belt 12 is driven. Housing 14 comprises for this purpose an opening 16 in its rear wall, the operation of which will be further elucidated below.

Figure 3:
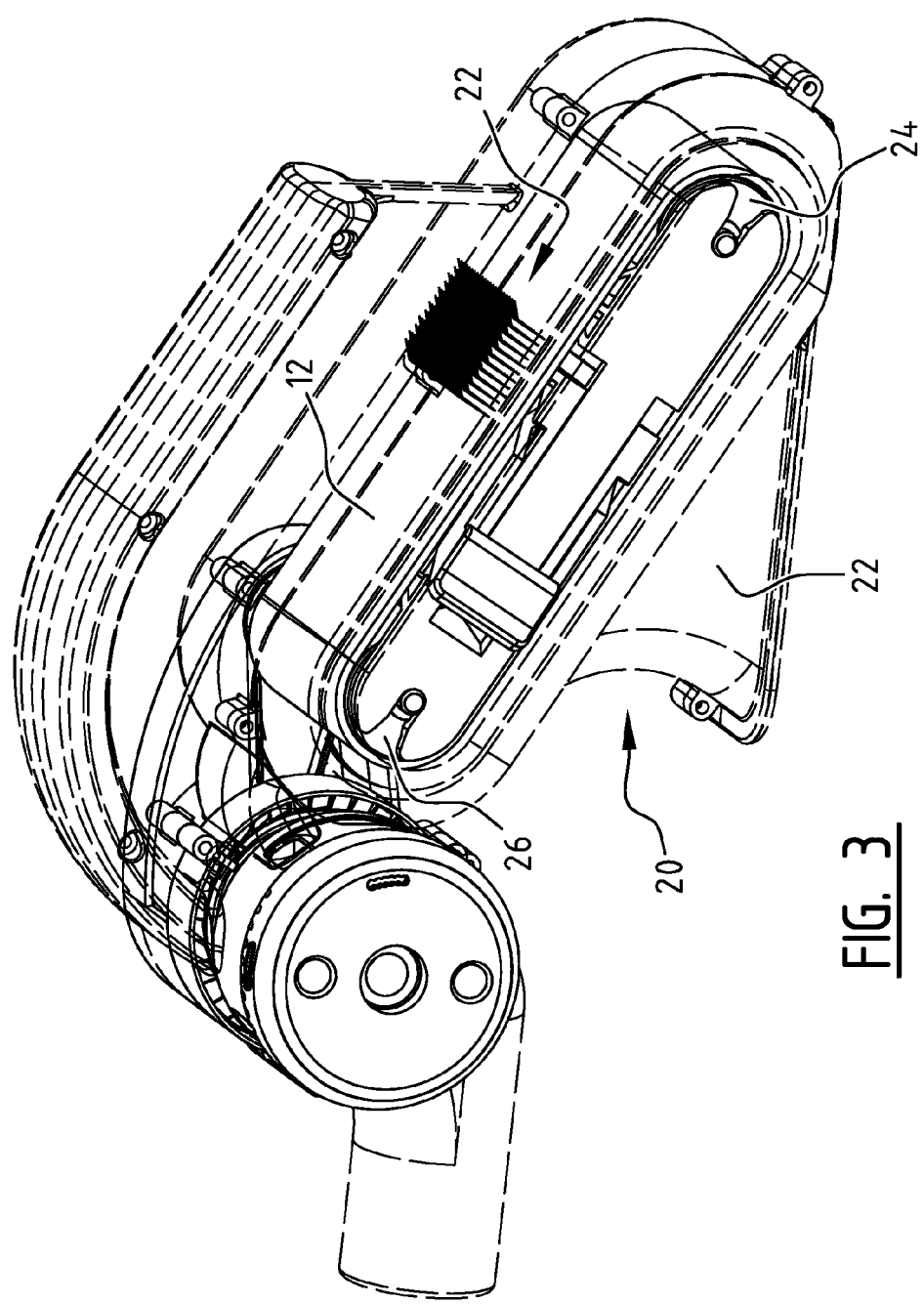
FIGS. 3-4 show perspective views of the grooming device of FIGS. 1 and 2.

Belt 12 is placed at an angle a relative to the skin of animal 4 during use. This is achieved by a spacer 18 which in the shown embodiment has a wedge shape (FIG. 3). Spacer 18 comprises an inward curvature 20. Belt 12 is provided on rollers 24, 26. Spacer 18 realizes an angle of belt 12 relative to the skin of animal 4 so that roller 24 has a lower position during use than roller 26. As shown in FIG. 2, the hairs of the coat will follow the curvature 20 of the spacer when they are carried along by belt 12. Long hairs are therefore prevented from making their way beyond roller 26 by curvature 20. In other words, the curvature increases the length of the path from the skin to roller 26. The angle a and the height of spacer 18 can be adapted to the length of the hairs. Spacer 18 is for instance adjustable (not shown) or removable and replaceable by another spacer.

Figure 4:
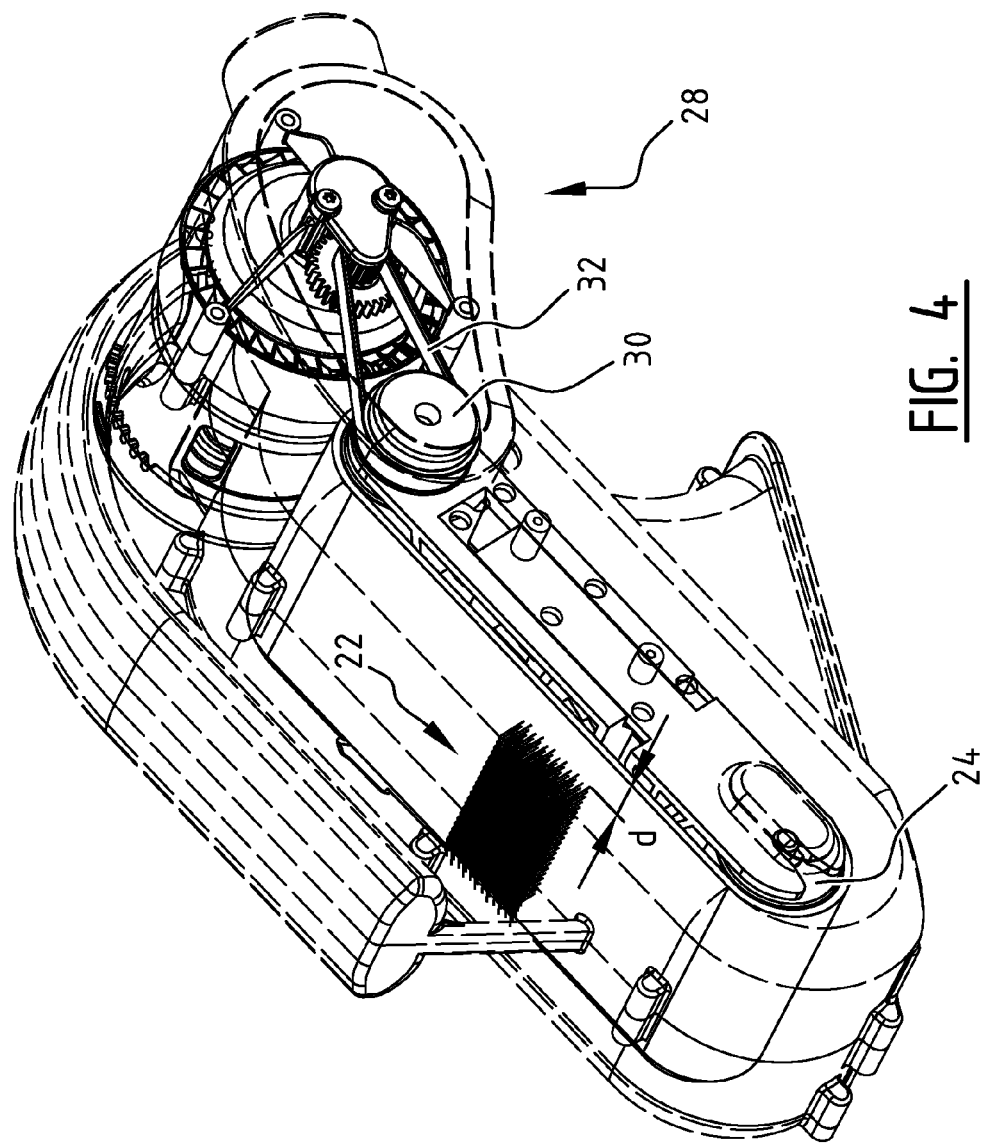

Belt 12 comprises teeth 22 provided at a distance from each other on its surface. Teeth 22 are at a distance d from the edge of belt 12 (FIG. 4). FIGS. 3, 4, 16, 17 show by way of illustration only a small part of the surface of belt 12 provided with teeth 22. Belt 12 is in practice preferably provided over its whole length, at least substantially its whole length, with teeth 22. Teeth 22 are manufactured from metal. The teeth preferably have a thickness of about 1 mm. Teeth 22 are preferably elongate and comprise a bend. Bristles can alternatively be provided instead of teeth 22.

Belt 12 is driven by a drive 28 (FIG. 4). This drive comprises a drive wheel 30 which is coupled to upper roller 26.

Figure 5:
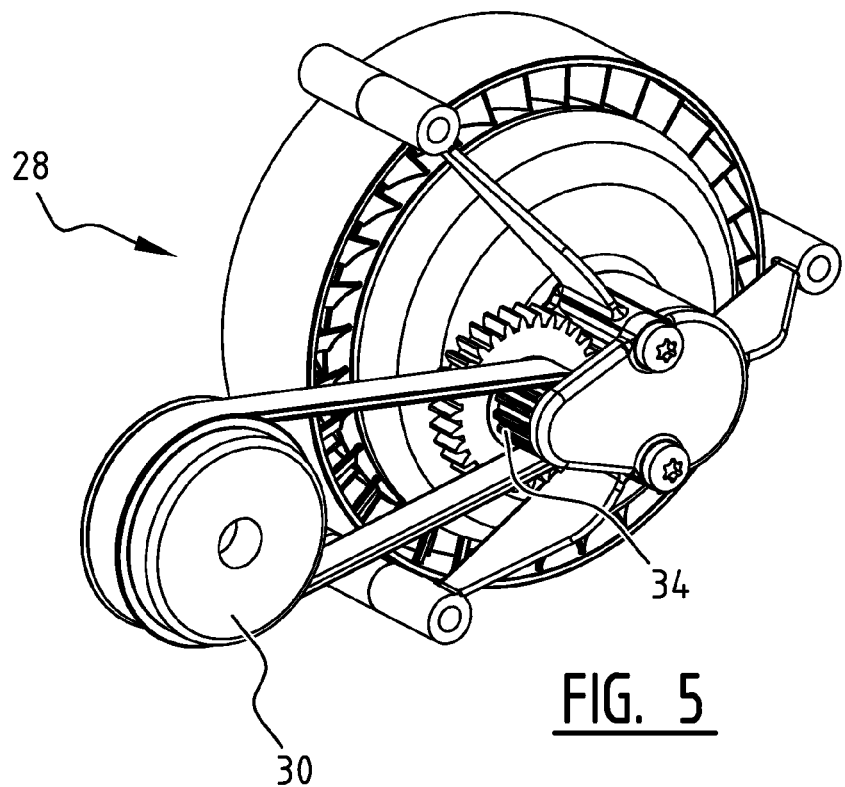
FIGS. 5-7 show details of a first possible drive of the grooming device of FIGS. 1-4.
Figure 6:
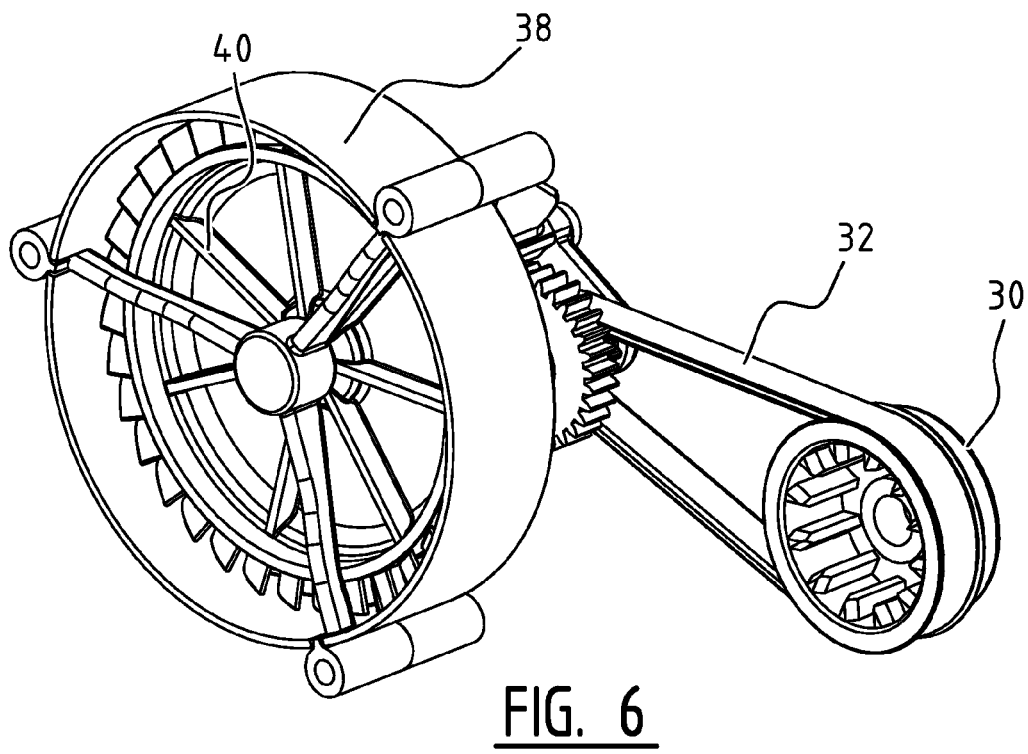
Figure 7:
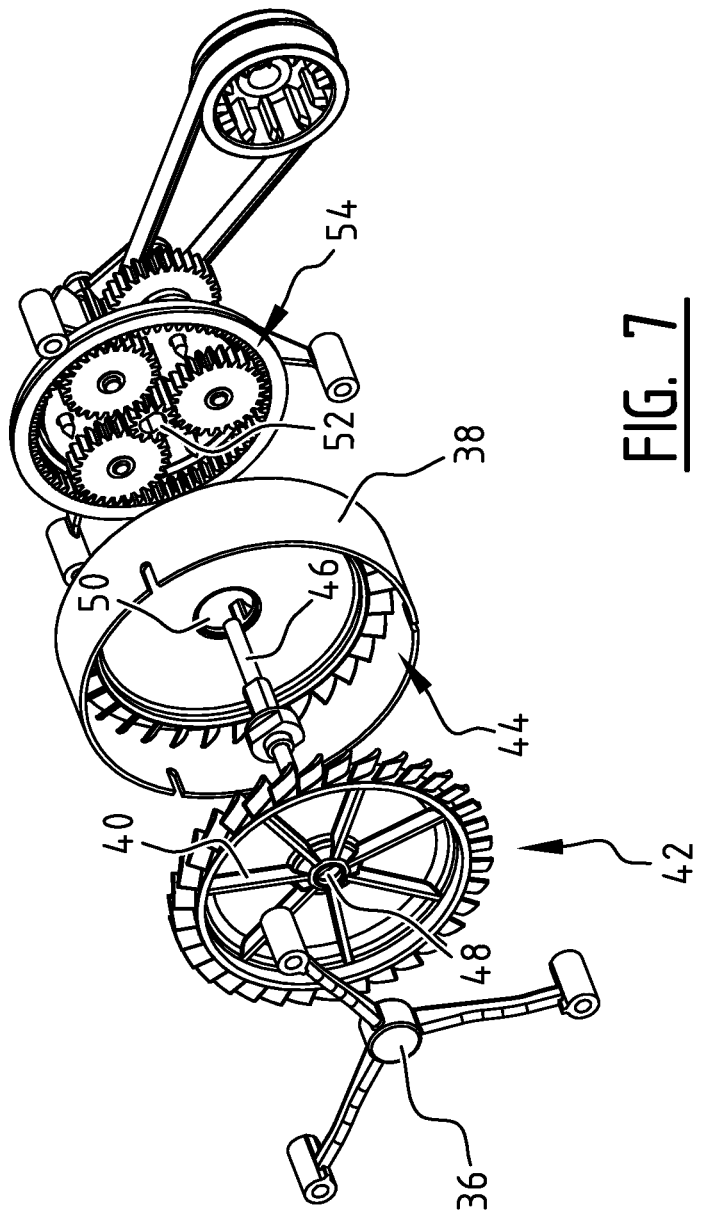
Figure 8:
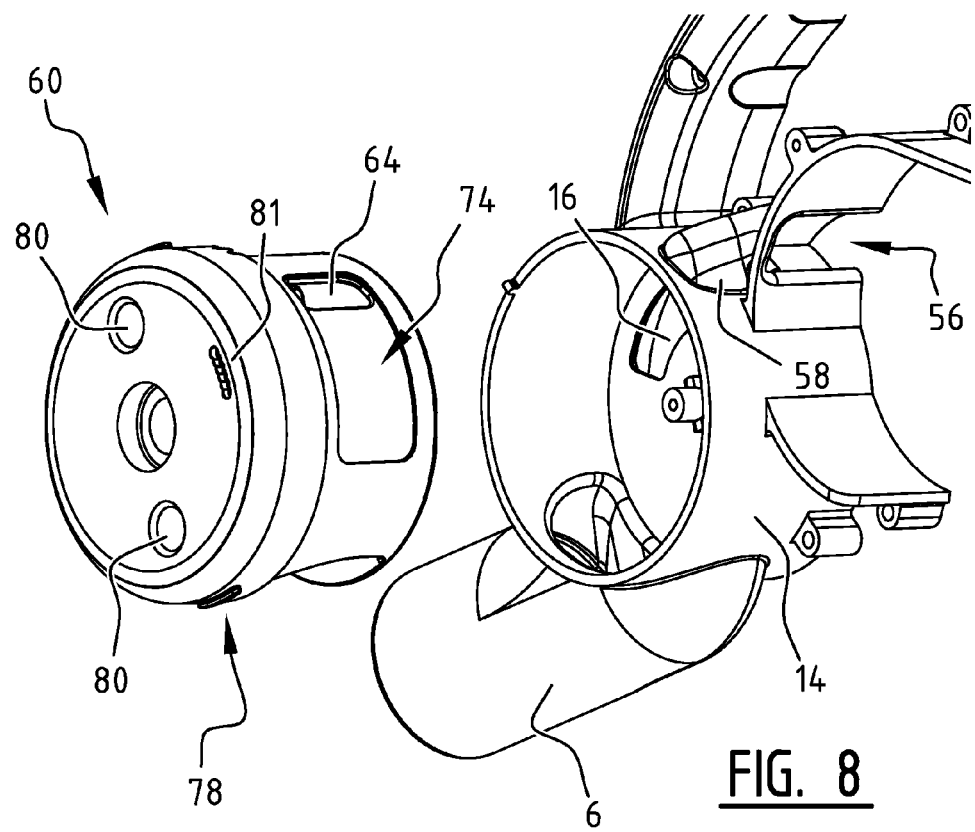
FIGS. 8-12 show a system for regulating the force with which hairs are suctioned out.

In a first embodiment of the drive, drive wheel 30 is coupled via belt 32 to gear 34 (FIG. 5). In the first embodiment belt 12 is driven by means of the suction force of the vacuum cleaner. Drive 28 comprises for this purpose a suspension 36 in a housing 38 (FIG. 6) in which are provided blades 40 which can rotate relative to suspension 36 and housing 38. The blades begin to rotate due to the suction force of the vacuum cleaner. The blades are connected to a ring 42 (FIG. 7) on which vanes are likewise provided for driving by means of the suction force of the vacuum cleaner. Additional vanes 44 are provided in housing 38. Blades 40 and ring 42 are fixedly connected to shaft 46 which passes through opening 48 in the centre of blades 40 and is suspended in suspension 36. Shaft 46 likewise runs through an opening 50 in housing 38 and is coupled to central gear 52 of gear system 54 for the purpose of transmitting the movement of blades 40, ring 42 and vanes 44 to drive wheel 30 via drive belt 32. As described with reference to FIG. 2, hose 6 is coupled via coupling piece 7 and housing 14 to the frame of device 2. Housing 14 comprises an opening in its side wall which is connected via connecting part 58 to an opening 56 (FIG. 8) which debouches close to the upper roller 26 of belt 12. Hair carried along by belt 12 can thus be suctioned in the direction of the vacuum cleaner via opening 56, connecting part 58, housing 14, coupling piece 7 and hose 6. Housing 14 likewise comprises in its rear wall an opening 16 which connects housing 14 to housing 38 of drive 28 so that the suction force of the vacuum cleaner can drive the belt.

Figure 9:
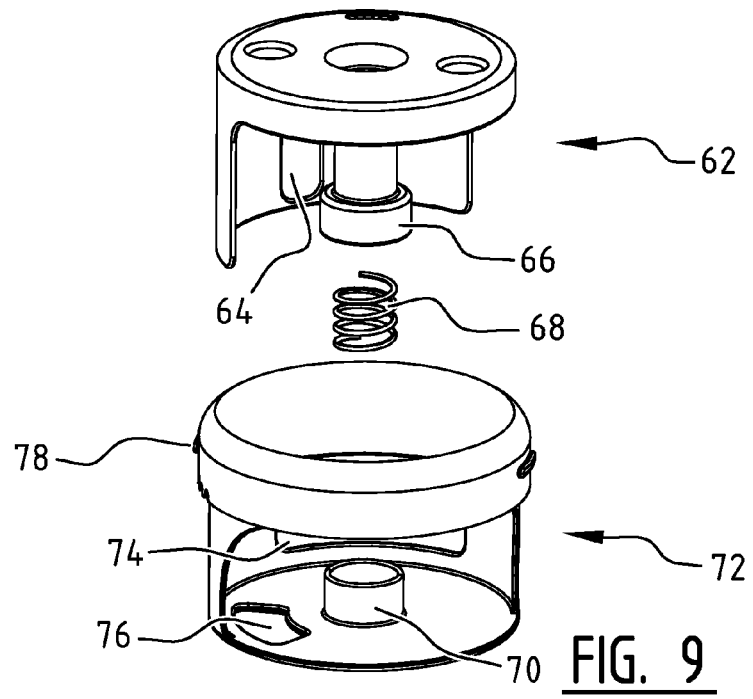

A control mechanism 60 is placed in housing 14. Control mechanism 60 comprises an inner part 62 (FIG. 9) with a substantially cylindrical form, wherein the curved side wall of the cylinder comprises an opening 64. Inner part 62 comprises a central protrusion 66 in which is received a spring 68 which couples protrusion 66 to a corresponding protrusion 70 for the purpose of coupling inner part 62 to outer part 72 of control mechanism 60. The outer part 72 of control mechanism 60 likewise comprises a substantially cylindrical form, wherein the curved side wall of the cylinder comprises an opening 74 and the base surface of outer part 72 comprises an opening 76. As shown in FIGS. 8, 10-12, the positions of both inner part 62 and outer part 72 relative to housing 14 can be adjusted independently of each other. The position of opening 64 relative to the opening in the side wall of housing 14 which connects the housing to opening 56 can hereby be adjusted for the purpose of adjusting the suction close to roller 26. The position of opening 76 in outer part 72 can likewise be adjusted relative to opening 16 in housing 14 in order to thus adjust the quantity of air which is suctioned in for the purpose of driving the belt 12. A user can grip a ridge 78 on the outer wall of outer part 72 in order to rotate outer part 72. A user can grip openings 80 on the upper side of upper part 62 and/or ridge 81 in order to rotate inner part 62.

Figure 10:
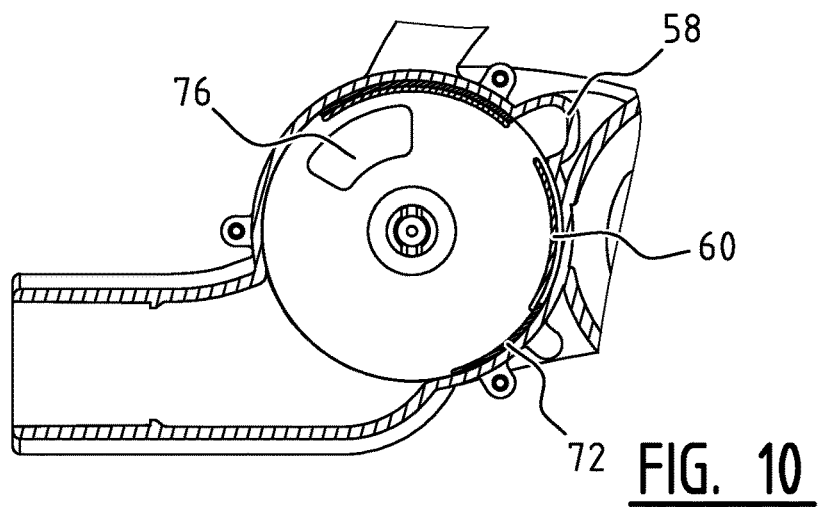

FIG. 10 shows an setting of control mechanism 60 in which opening 76 of lower part 72 coincides with opening 16 of housing 14 so that a maximum of air is suctioned in for the purpose of driving the belt 12. Opening 64 and opening 74 are moreover situated such that the connection to opening 56 is opened to a maximum so that a maximum of air is suctioned out of the guard around belt 12.

Figure 11:
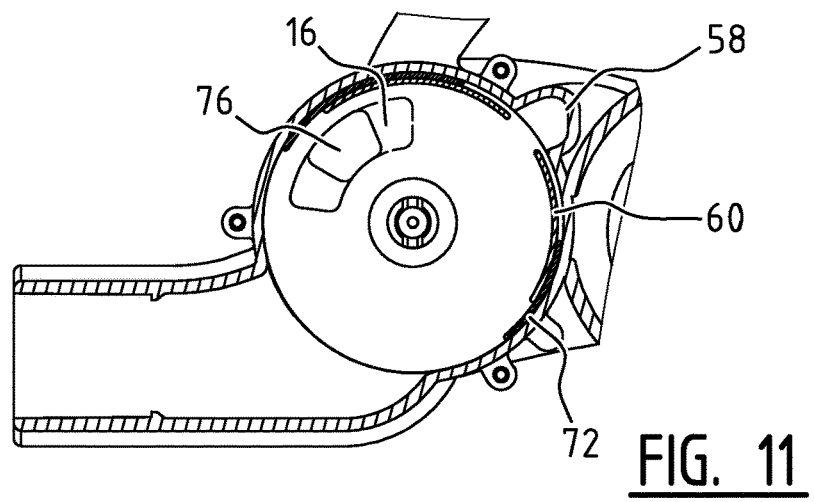

FIG. 11 shows a position of control mechanism 60 in which opening 76 is no longer aligned with opening 16 of housing 14. Belt 12 will hereby be driven less quickly by drive 28. In FIG. 11 opening 64 and opening 74 are still aligned with the opening in the side wall of housing 14 so that a maximum of hair is suctioned out of the guard around belt 12.

Figure 12:
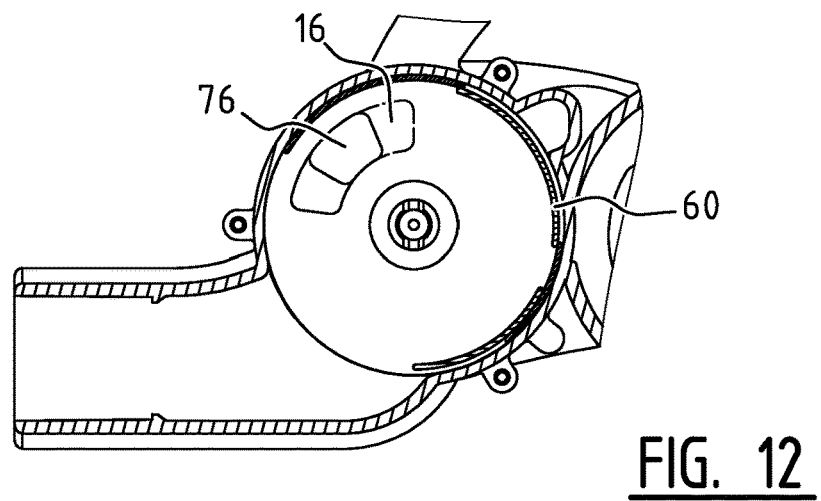
Figure 16:
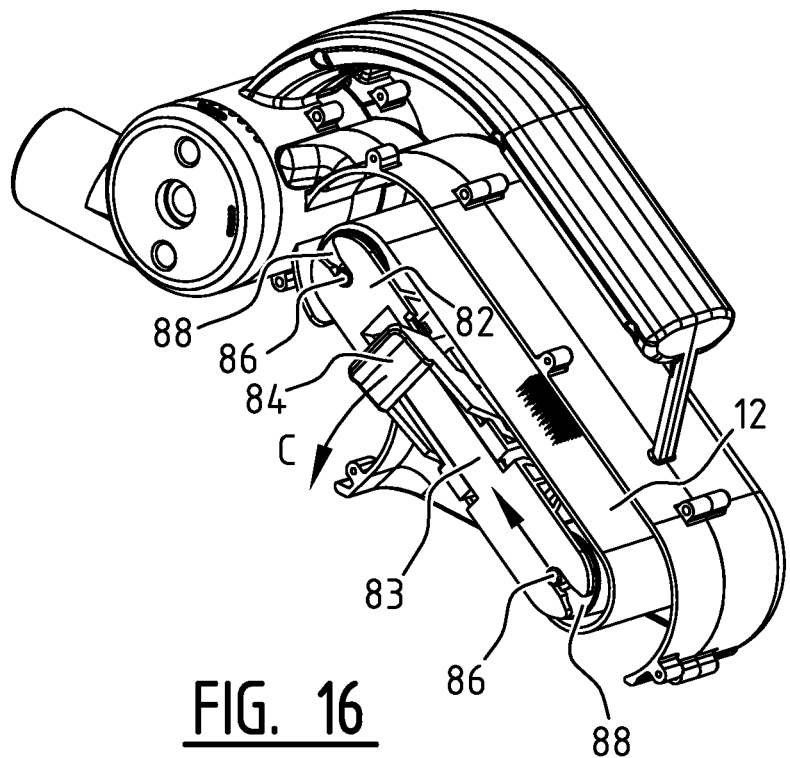
FIGS. 16 and 17 show the tensioning mechanism of the grooming device of the foregoing figures with which the brush belt can be removed from the device.

FIG. 12 shows a position in which opening 76 of lower part 72 is not aligned with opening 16 in the rear wall of housing 14, so that the belt is driven less quickly. In FIG. 12 opening 64 is moreover rotated to a position in which opening 64 is not aligned with the opening in the side wall of housing 14 so that no hair, or at least substantially no hair, is suctioned out of the guard around belt 12. It is noted that it is also possible with control mechanism 60 to partially reduce the suctioning of hair. Control mechanism 60 enables a continuously variable adjustment of both the suction force on drive 28 and the suctioning of hairs from belt 12.

Another drive, for instance an electrical drive, can be applied instead of a driving of belt 12 on the basis of the suction force of the vacuum cleaner. Device 2 then for instance comprises an accumulator for providing the drive with electrical energy, or device 2 is provided with a cord with plug. FIG. 13 shows an embodiment of an electrical drive for the brush belt. Drive wheel 30 is also connected in this embodiment to a gear 34 via drive belt 32. The electrical drive comprises an electric motor 55 which drives wheel 30, and thereby brush belt 12, via the central gear 52 of gear system 54, gear 34 and drive belt 32. Electric motor 55 can be provided with electric current via a cord, accumulator or batteries.

FIGS. 14 and 15 show another embodiment of a grooming device according to the invention with an electrical drive. In the shown embodiment an accumulator 57 or one or more batteries are accommodated in handle 8. Also provided on handle 8 is a knob 59 for switching electric motor 61 on and off. The speed at which brush belt 12 rotates is preferably adjustable by means of knob 59 or an additional knob. Knob 59 is for instance embodied as a slide knob or rotary knob with different positions corresponding to different speeds for brush belt 12.

Motor 61 is directly coupled to gear 34. Motor 61 can comprise an electric motor, although this is optional.

In an embodiment with an electrical drive it is possible to dispense with the regulation of the air throughfeed from the vacuum cleaner in the direction of the feed as shown in FIGS. 8-12. A control mechanism is preferably still provided for adjusting the suction force for suctioning out hair at brush belt 12. This control mechanism is however also optional according to the invention.

Figure 17:
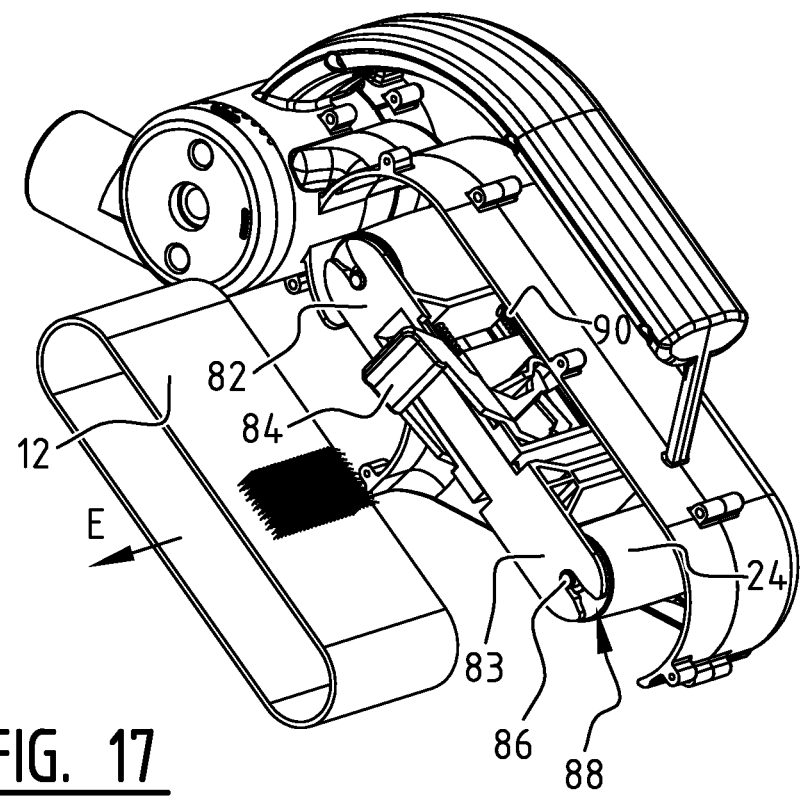

Rollers 24, 26 are provided on a frame 82, 83 (FIGS. 16-17) which is constructed from a first part 82 and a second part 83. Parts 82 and 83 are movable relative to each other so that the frame can be brought into a tensioned state (FIG. 16) and an untensioned state (FIG. 17). In the tensioned state, i.e. the position of use, first part 82 and second part 83 are held at a maximum distance from each other. The frame of belt 12 can be brought into an untensioned state by means of handle 84, which acts as lever. Handle 84 is for this purpose moved as according to arrow C, wherein second part 83 moves in the direction of first part 82 as according to arrow D. Belts 24, 26 are suspended by means of shafts 86 in frame 82. 83, wherein shafts 86 are received in recesses 88 at the outer end of the first and second parts 82, 83. In the untensioned state, i.e. when handle 84 has been moved as according to arrow C (FIG. 16), belt 12 can be removed from rollers 24, 26. Visible in FIG. 17 are springs 90 which support the movement from the tensioned to the untensioned state.

Figure 18:
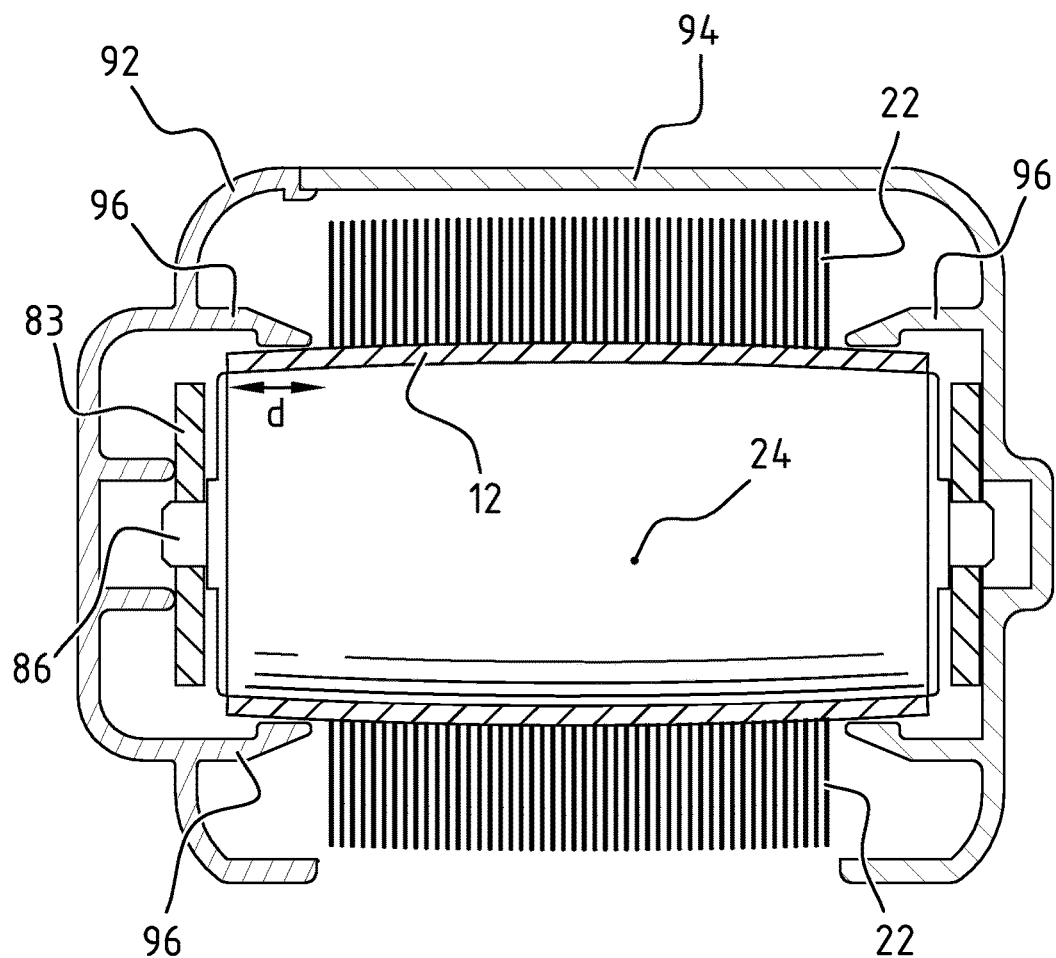
FIG. 18 shows a cross-section of a grooming device according to the foregoing figures.

Rollers 24, 26 are preferably accommodated in a housing constructed from two parts 92, 94 (FIG. 18). Rollers 24, 26 have a slightly convex form. It is moreover clearly recognizable in FIG. 18 that a strip with dimension d is free of brush teeth 22 on either side in the width direction of brush belt 12. Housing parts 92, 94 comprise protrusions 96 which are situated close to brush belt 12 or which even make contact with brush belt 12. Protrusions 96 are placed here on the top and bottom side of brush belt 12 and also on either side in the width direction. The protrusions preferably extend over the whole length of the brush belt, or at least substantially the whole length of the brush belt. The protrusions effectively seal shafts 86 of rollers 24, 26 from the space in which brush belt 12 is situated. This prevents hair carried along by brush belt 12 from being able to reach shafts 86 of rollers 24, 26 Jamming of the device is thus prevented.

Figure 19:
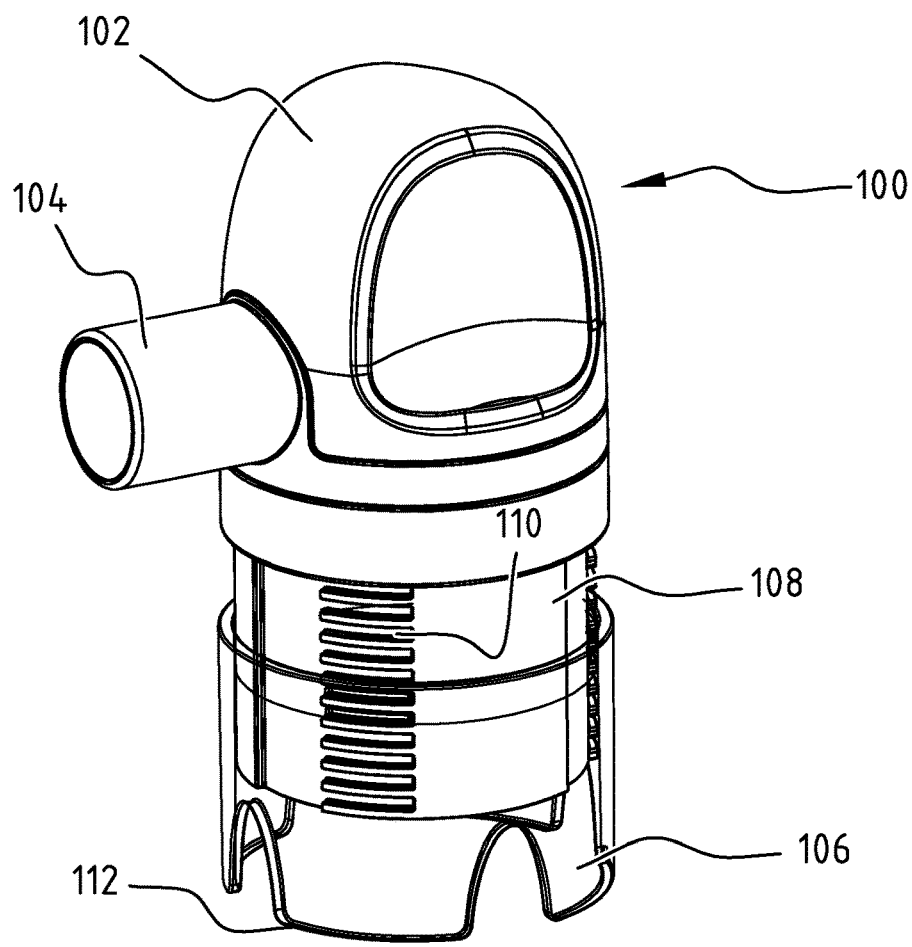
FIGS. 19-21 show an embodiment of a grooming device with a trimming unit according to the invention.

A grooming device 100 with a trimming unit (FIGS. 19-21) comprises a housing 102 with a connection 104 for a vacuum cleaner or vacuum cleaner hose. A spacer 106 is provided on the housing.

In the shown embodiment the housing comprises a cylindrical lower part 108 provided with external screw thread 110. Spacer 106 is likewise cylindrical and comprises internal screw thread (not shown), wherein spacer 106 is screwed onto the lower part 108 of housing 102. The distance between lower edge 112 of spacer 106 and housing 102 is adjustable by means of screwing. Lower edge 112 is placed in use onto the skin of the animal to be trimmed so that hair can be suctioned in via opening 113.

Figure 20:
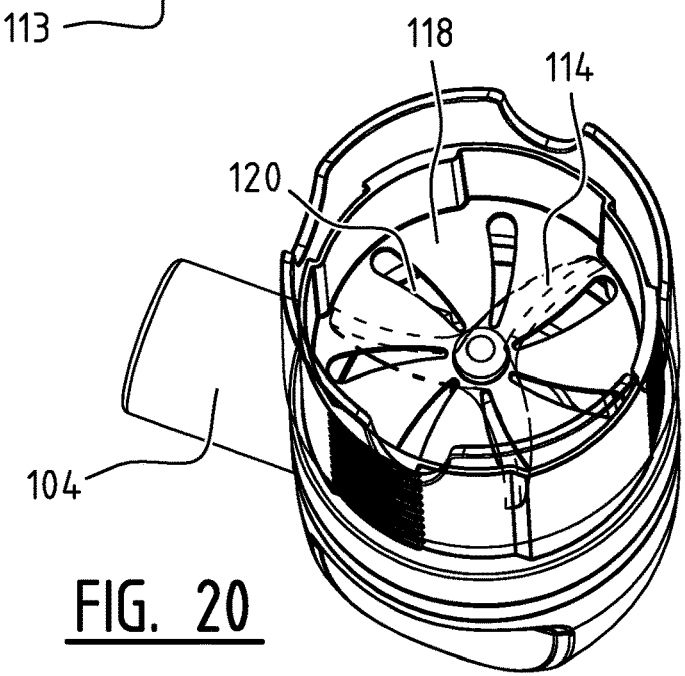
Figure 21:
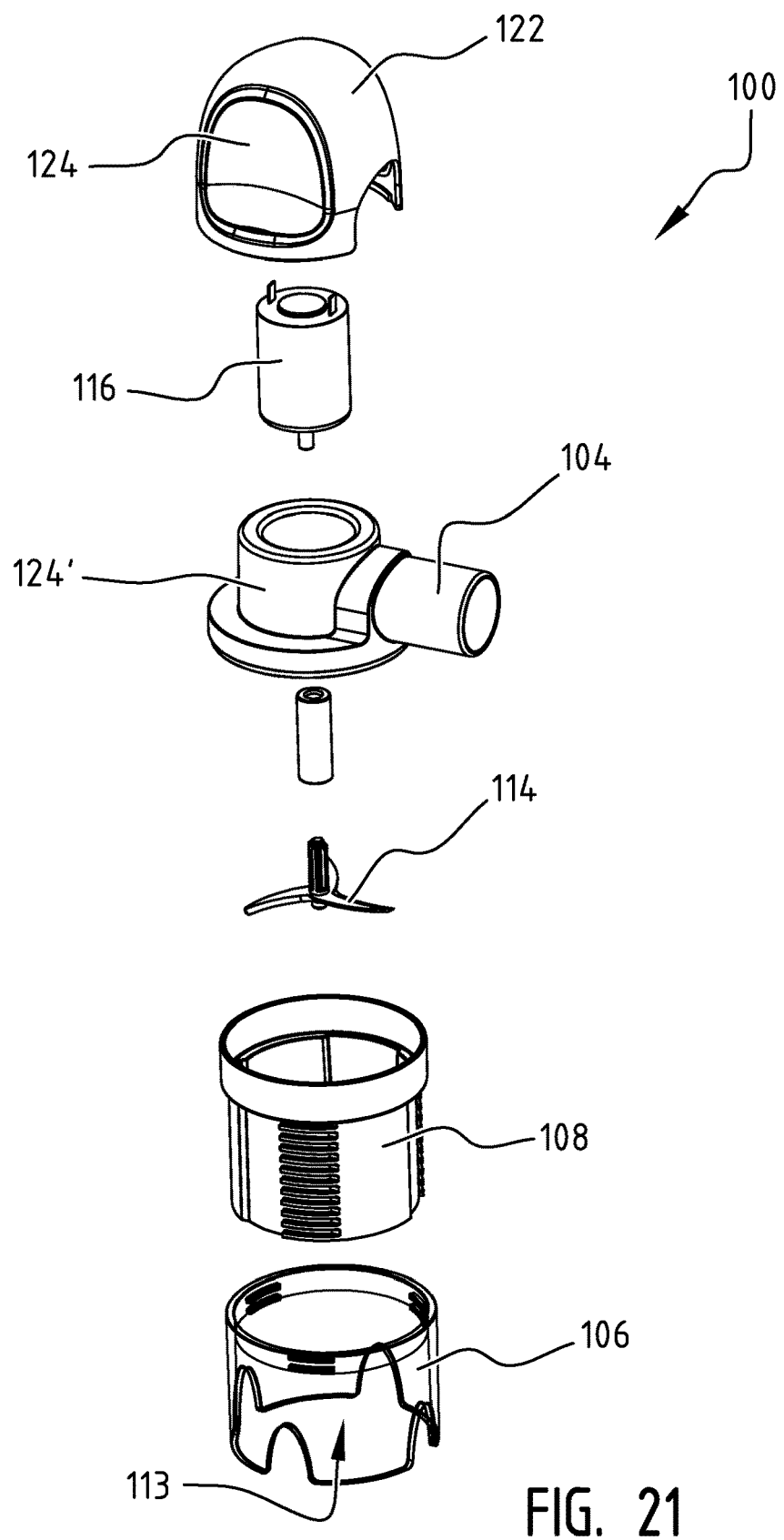

A rotatingly drivable blade 114 is arranged in housing 102 (FIGS. 20 and 21). The blade is driven by means of electric motor 116. A cover plate 118 is arranged between the blade and lower opening 113. This plate 118 comprises openings 120. In the shown embodiment openings 120 are slot-like, although other shapes are likewise possible. A mesh screen can moreover be placed on the front or rear side of cover plate 118 (not shown).

Housing 102 is assembled from cap 122, central part 124 on which connection 104 is provided and lower part 108 (FIG. 21). For ergonomic reasons cap 122 can be provided with an indentation 124 or other provisions for holding device 100, such as a handle. Electric motor 116 can be provided with electric current by an accumulator, one or more batteries or via a cord with plug.

The present invention is by no means limited to the above described embodiments thereof. The rights sought are defined by the following claims, within the scope of which many modifications can be envisaged.

The invention claimed is:

1. Coat grooming device for grooming a coat, comprising:
a housing;
a grooming unit connected to the housing and provided with an endless brush belt, wherein the grooming unit is further provided with a suction means; and
a drive operatively connected to the endless brush belt for actuating the endless brush belt,
a spacer integrally formed with the grooming unit, the spacer being configured to maintain the grooming unit at a fixed distance from a bottom surface of the spacer which is configured to abut the skin lying beneath the coat during use,
wherein the spacer is wedge-shaped and is configured to maintain the endless brush belt within the grooming unit at fixed angle within the range of 20-70 degrees relative to the bottom surface of the spacer,
wherein the bottom surface of the spacer comprises an opening configured to allow hairs from the coat to make contact with the endless brush belt, and
wherein the spacer further comprises a curvature defined along a height of at least one surface to prevent hairs fixed to the coat from extending past the endless brush belt.

2. The coat grooming device for grooming a coat as claimed in claim 1, wherein during use the endless brush belt is provided at an angle to the skin lying beneath the coat, the suction means comprises a vacuum cleaner hose for suctioning hair from the endless brush belt.

3. The coat grooming device for grooming a coat as claimed in claim 2, wherein brush bristles or brush teeth are provided at a distance from each other on the surface of the endless brush belt, wherein the endless brush belt is provided around rotatable rollers, and wherein the suction means comprises a vacuum cleaner hose coupled close to at least one of the rotatable rollers.

4. The coat grooming device for grooming a coat as claimed in claim 3, wherein an edge of the endless brush belt is free of the brush bristles and the brush teeth.

5. The coat grooming device for grooming a coat as claimed in claim 2, further comprising a guard arranged around or close to the grooming unit for the purpose of preventing hairs coming to lie between moving parts.

6. The coat grooming device for grooming a coat as claimed in claim 5, further comprising a comb for removing hair from the endless brush belt.

7. The coat grooming device for grooming a coat as claimed in claim 5, wherein the guard comprises air guides for realizing an underpressure during use such that hairs of the coat extend upward from an underlying skin.

8. The coat grooming device for grooming a coat as claimed in claim 1, wherein the curvature is a concave orientated curvature defined in a proximal edge of the spacer.

9. The coat grooming device for grooming a coat as claimed in claim 1, wherein the wedge-shaped spacer is adjustable for the purpose of setting the angle relative to the skin.

10. The coat grooming device for grooming a coat as claimed in claim 1, further comprising a rotatable brush element, the rotatable brush element further comprising a comb for removing hair from the endless brush belt.

11. The coat grooming device for grooming a coat as claimed in claim 1, further comprising a handle for tensioning and slackening the endless brush belt.

12. The coat grooming device for grooming a coat as claimed in claim 1, wherein the wedge-shaped spacer is adjustable for the purpose of setting a distance relative to the skin and the grooming device.

13. Method for grooming a coat, comprising the steps of:
providing the coat grooming device as claimed in claim 1;
grooming the coat; and
cleaning the endless brush belt during grooming.

* * * * *